INVENTORS
DONALD B. CALDWELL
CARL A. DAHLQUIST
ROBERT L. ELTON
LESLIE E. ROBERTSON
BY *Kinney, Alexander,
Sell, Steldt & DeLaHunt*
ATTORNEYS

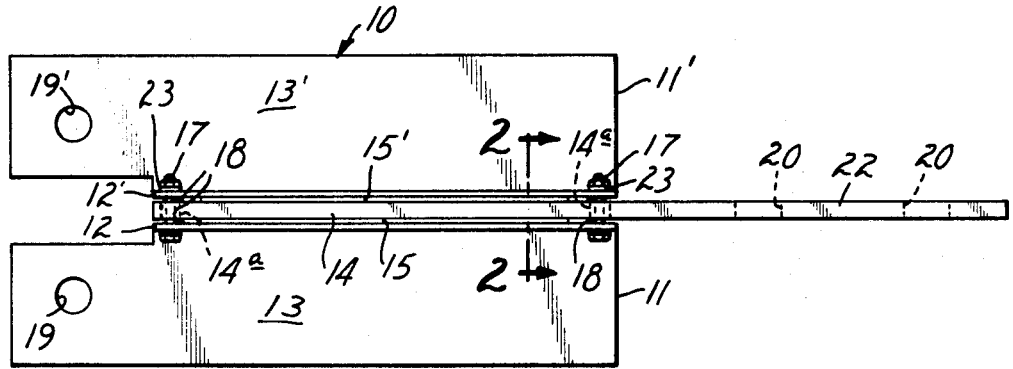
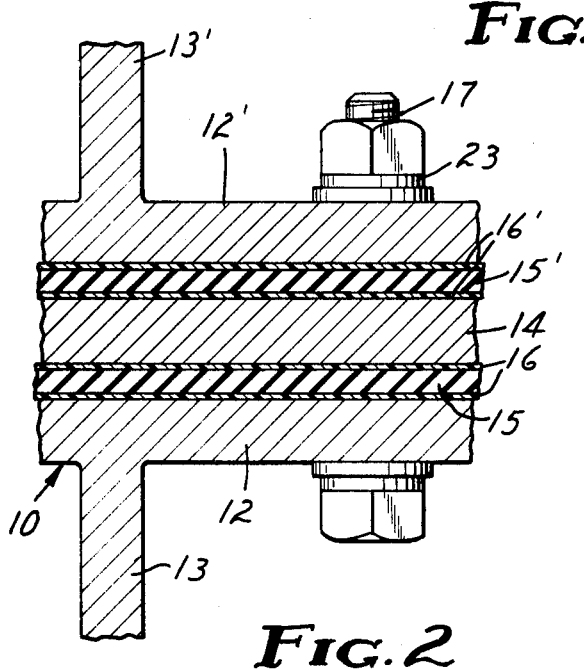
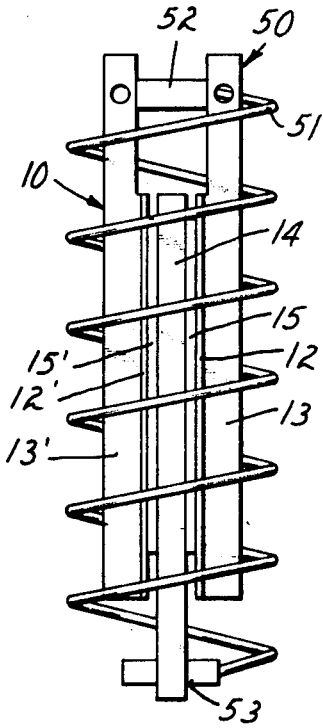
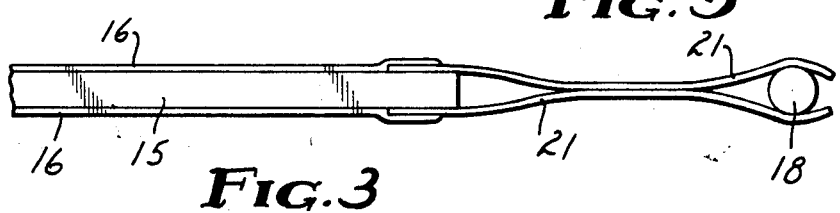

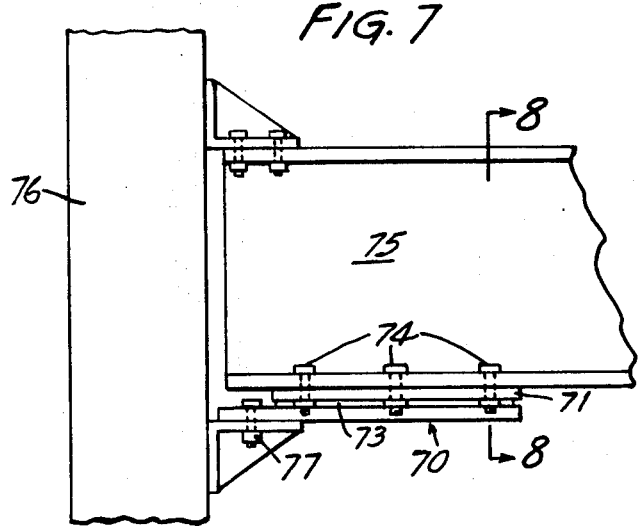
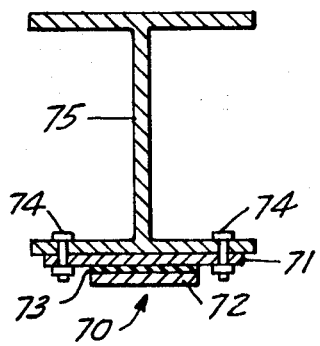
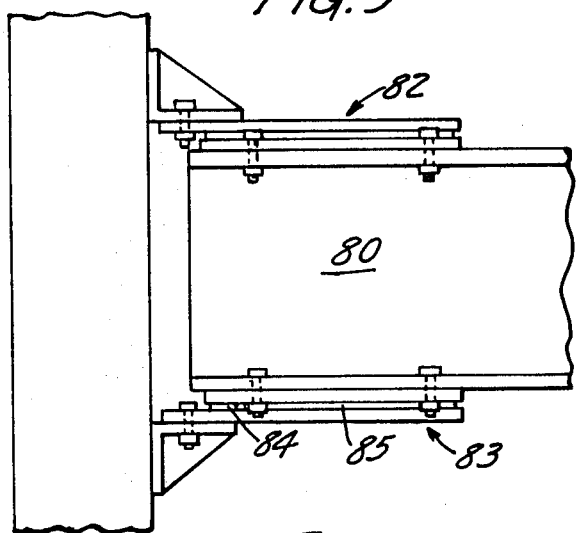
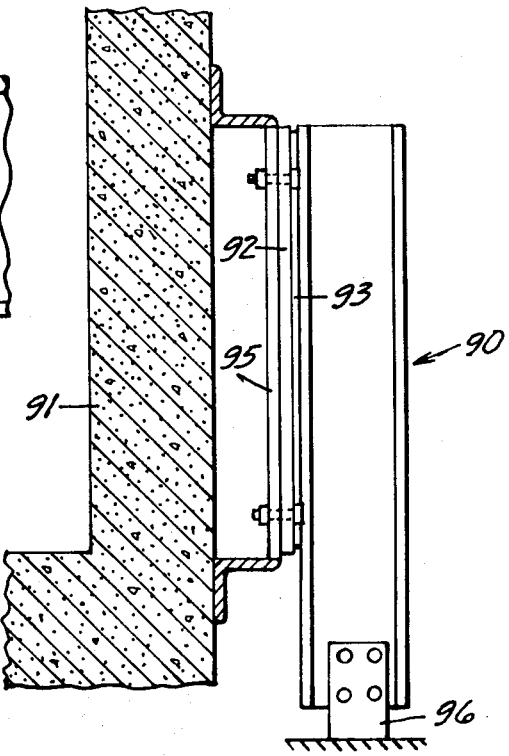
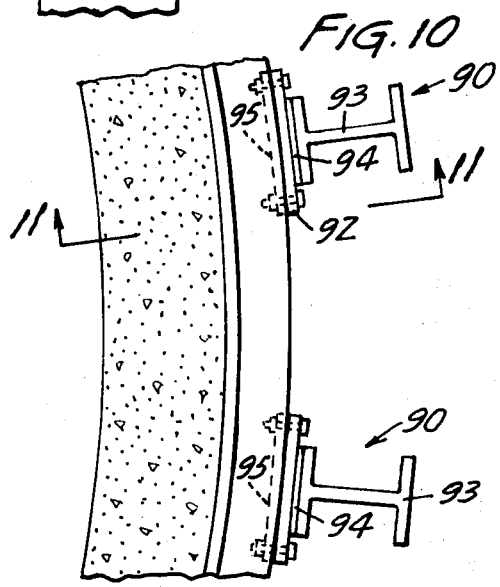

United States Patent Office 3,605,953
Patented Sept. 20, 1971

3,605,953
BIDIRECTIONAL DAMPING UNIT
Donald B. Caldwell, East Oakdale Township, Washington County, Carl A. Dahlquist, Roseville, and Robert L. Elton, White Bear Lake, Minn., and Leslie E. Robertson, Fairfield County, Conn., assignors to Minnesota Mining and Manufacturing Company, St. Paul, Minn.
Continuation-in-part of application Ser. No. 746,053, July 19, 1968. This application May 26, 1969, Ser. No. 830,577
Int. Cl. F16f 7/08
U.S. Cl. 188—1
11 Claims

ABSTRACT OF THE DISCLOSURE

A damping unit for use in a building structure subject to subsonic oscillations such as the wind may induce in a tall building or stack or bridge. The damping unit includes at least a pair of rigid members having broad surfaces separated by a viscoelastic layer. The improvement resides in the viscoelastic material which may be a copolymer of acrylic monomers such as a copolymer of isooctyl acrylate and acrylic acid. The viscoelastic layer may be adherently bonded to the broad rigid surfaces by a room-temperature-curing epoxy resin composition.

This application is a continuation-in-part of application Ser. No. 746,053, filed July 19, 1968, now abandoned.

BACKGROUND OF THE INVENTION

Very tall buildings (skyscrapers) are designed to sway with the wind, but it is highly desirable to minimize this so that occupants do not feel the movement and so that neither the building nor equipment in the building is deleteriously affected in any way. To a lesser extent, relatively lower buildings experience undesirable subsonic oscillations such as may be caused by earth movements or which may be produced locally by machinery or by footsteps.

For many years, rubbery and viscous materials have been used for damping and isolating vibrations and oscillations, particularly in vehicles such as aircraft, and to a lesser extent in buildings. Typical are U.S. Pats. Nos. 2,877,970 (Albertine), No. 3,159,249 (Lazan), No. 3,271,188 (Albert), No. 3,327,812 (Lazan), No. 3,078,969 (Campbell), No. 3,211,491 (Browne), No. 2,272,639 (Jack), and British Pat. No. 968,326. The "energy absorbing member 19" of Browne Pat. No. 3,211,491 and the "vibration isolating device 15" of Jack Pat. No. 2,272,639 are superficially similar in construction to the damping unit of the present invention but are fundamentally much different. The rubber which each employs would not be effective for damping subsonic oscillations of tall buildings in the manner of the present invention.

THE PRESENT INVENTION

The present invention concerns a bidirectional damping unit which comprises at least two rigid members, each having a stiffness exceeding that of 0.1-inch steel plate and having at least one broad surface separated from a broad surface of an adjacent of said rigid members by a layer of viscoelastic material which is firmly adherently bonded to said surfaces. For example, each damping unit may include three rigid members, the central member of which has a pair of flat, parallel broad surfaces in order to provide symmetry, each member including attaching means extending generally parallel to said broad surfaces, with the attaching means of the central rigid member extending in one direction and the attaching means of the outer rigid members extending in the opposite direction.

The trusses of the building may be structurally fastened to the vertical columns substantially at the planes of the overlying floors and may be connected by the damping units to the columns substantially at the planes of the underlying ceilings. When thus installed, the viscoelastic layers extend horizontally between the columns and trusses so that oscillations of the building are to an appreciable extent damped by shearing forces within the viscoelastic material.

The viscoelastic material should be age-resistant and have a glass transition temperature between $+5°$ and $-50°$ C. (preferably between $0°$ and $-20°$ C.) and, when measured at $23°$ C. and a frequency of 0.1 cycle per second, a loss tangent of at least 0.5, a complex shear modulus of about 50–1000 pounds per square inch and a shear strain value of at least about one. Its ultimate shear strength should be at least 200 p.s.i. and its elongation in tension should be at least 100% at $23°$ C. The viscoelastic layer should be firmly adherently bonded to the broad surfaces of the rigid members such that there is no adhesive failure when the shear strain in the viscoelastic layer is one. This may be achieved by adhesive compositions of age-resistant materials which preferably cure at room temperature without evolution of volatiles to bond strongly both to the rigid members and to the viscoelastic layer. The adhesive layers should have a shear strength at least as great as that of the viscoelastic material, a complex shear modulus or stiffness such that substantially all the deformation takes place in the viscoelastic layer, and a bonding strength to the material of said rigid members and to the material of said viscoelastic layer which substantially equals or exceeds the shear strength of the viscoelastic material.

The foregoing requirements for the viscoelastic layer can be attained with various semi-rigid polymers by the inclusion of plasticizers, except that to achieve age-resistance, some means must be devised for preventing the plasticizer from gradually migrating and exuding out of the viscoelastic layer. Such loss of plasticizer causes the viscoelastic layer to eventually become undesirably rigid and also tends to soften and weaken the adhesive layers by which the viscoelastic layer is bonded to the rigid members of the damping unit.

As an illustration, the composition of 100 parts polyvinyl chloride and a little above 50 parts of plasticizer, viz, "Paraplex" G–25, initially meets the requirements for the viscoelastic layer. "Paraplex" G–25 is understood to be a polyester of essentially equal molar proportions of 1,2-propylene glycol and sebacic acid and has a number average molecular weight, determined by the vapor pressure method, of about 5300 and an acid number of about 1.5.

Those skilled in the art should be able to tailor other polymers such as polyurethanes, particularly polyetherurethanes, to meet the above-listed requirements, although presently commercially available polyurethanes are too elastic or rubbery for the purposes of the present invention. Polymethacrylates, when properly plasticized, would be useful, with means for controlling plasticizer migration.

In any event, the viscoelastic material and the adhesive should be stable for long periods under normal conditions of use, primarily at ordinary room temperature since the areas in which the damping units are to be installed generally are air-conditioned. Particularly preferred in this respect are copolymers of alkyl acrylate and one or more copolymerizable acrylic monomers such as acrylic acid, methacrylic acid, acrylonitrile, methacrylonitrile, acrylamide, and methacrylamide. The alkyl acrylate may be a single monomer having about 6–10 carbon atoms in its alkyl group which is not highly branched, i.e., more than half of the alkyl carbon atoms are in a straight chain terminating at the oxygen bridge. Where the alkyl acrylate is a mixture of monomers, their alkyl groups should have an average of about 6–10 carbons, and less than half of the alkyl groups should be highly branched. Over the range of about 60–85 parts of alkyl acrylate and correspondingly 15–40 parts of one or more of the named copolymerizable acrylic monomers, useful copolymers are obtained which experience substantially no degradation or change during prolonged exposure to the atmosphere at ordinary room temperatures. However, some polymers within these parameters do not provide the requirements listed above for the viscoelastic layer. At below 15 parts of the copolymerizable acrylic monomer, the copolymer tends to be somewhat soft and to have a complex shear modulus below 50 pounds per square inch. At over 40 parts of the copolymerizable acrylic monomer, the copolymer is too stiff and generally does not meet the requirements for the viscoelastic layer.

In contrast to the limited number of suitable materials for the viscoelastic layer, the requirements for the adhesive layer are met by many adhesive compositions. Where the adhesive requires heat for curing, ovens provide the most economical way to apply the heat. However, room-temperature-curing adhesives provide good results, so there is no need to employ an adhesive that requires heating. In any event, substantially no volatile matter should be produced upon curing, since the evolution of volatile from the adhesive would tend to cause bubbling in the viscoelastic layer. Particularly preferred are epoxy resin adhesives, a number of which are available commercially which cure at room temperature without evolution of volatiles to provide strong bonds to steel and to viscoelastic materials.

THE DRAWING

FIG. 1 of the drawing is a schematic side elevation of a bidirectional damping unit to which the present invention is directed;

FIG. 2 is an enlarged, fragmentary cross-section along the line 2—2 of FIG. 1, distorted in scale to show details of construction;

FIG. 3 is a schematic side elevation illustrating a detail in the construction of the damping unit of FIG. 1;

Figure 6:
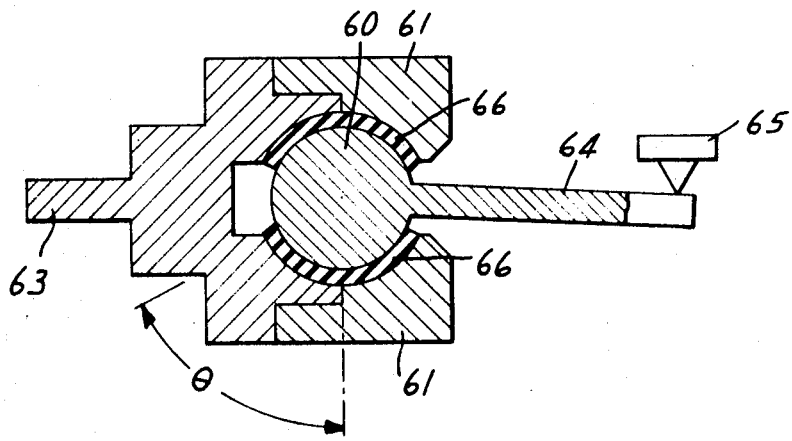

FIG. 5 schematically shows a damping unit of FIG. 1 as part of a load-bearing device;

FIG. 6 is a schematic central section of apparatus suitable for determining the shear moduli and the loss tangent of viscoelastic material of the type useful in the present invention;

FIG. 7 is a schematic elevation of another illustrative assembly in a building of a damping unit to which the present invention is directed;

FIG. 8 is a cross-section along line 8—8 of FIG. 7;

FIG. 9 is a schematic elevation of a third illustrative assembly in a building of a damping unit to which the present invention is directed;

FIG. 10 is a fragmentary plan view showing the positioning at the base of a tall stack of two damping units to which the present invention is directed; and FIG. 11 is a cross-section along line 11—11 of FIG. 10.

The damping unit illustrated in FIG. 1 is constructed of steel plate which is formed into three rigid members. Two of these are identical T-sections 11, 11', having flanges 12, 12' and webs 13, 13'. The third member is a flat steel bar 14 which has a pair of broad surfaces positioned between and substantially uniformly and closely spaced from the pair of broad surfaces provided by the flanges 12, 12'. Positioned in the spaces between the surfaces of the bar 14 and the flanges 12, 12' are viscoelastic layers 15, 15' and two pairs of adhesive layers 16, 16', as shown in FIG. 2.

The damping unit 10 is conveniently assembled using preformed layers of viscoelastic material beginning with a subassembly as illustrated in FIG. 3. To each end of the viscoelastic layer 15 are adhered by their own adhesive coatings a pair of pressure-sensitive adhesive strips 21 which extend across the full width of the viscoelastic layer and together position a wire shim 18 a short distance from the end of the viscoelastic layer. An adhesive layer 16 is coated on one surface of the viscoelastic layer 15 and the coated surface is placed against the flange 12. The other surface of the viscoelastic layer is then coated with a second adhesive layer 16 and the bar 14 is laid against the adhesive. A second viscoelastic layer 15' is then coated with an adhesive layer 16', laid against the exposed surface of the bar 14, coated with a second adhesive layer 16', and the other flange 12' placed against the open layer 16'. Four assembly bolts 17 are tightened over spring washers 23 against the wire shims 18, the diameter of which is such that the adhesive layers 16, 16' ooze out along the entire perimeter of each viscoelastic layer. The bolts 17 are left in the tightened position for a time sufficient to insure that the adhesive layers 16, 16' fully cure and until the damping unit is mounted in place using the attaching means provided by holes 19, 19' in the webs 13, 13', and holes 20 in an extension 22 of the bar 14.

After oozing of the adhesive is complete, excess adhesive and viscoelastic material is trimmed off along the sides. The pressure-sensitive adhesive strips 21 prevent the adjacent adhesive layers from contacting each other at the ends. Also, by employing a transfer-type tape for the adhesive strips 21, each strip delaminates between its carrier backing and adhesive layer during longitudinal movement of the flanges 12, 12' relative to the bar 14 so that continued relative longitudinal movement exerts shearing forces only on the viscoelastic layers 15, 15'.

Figure 4:
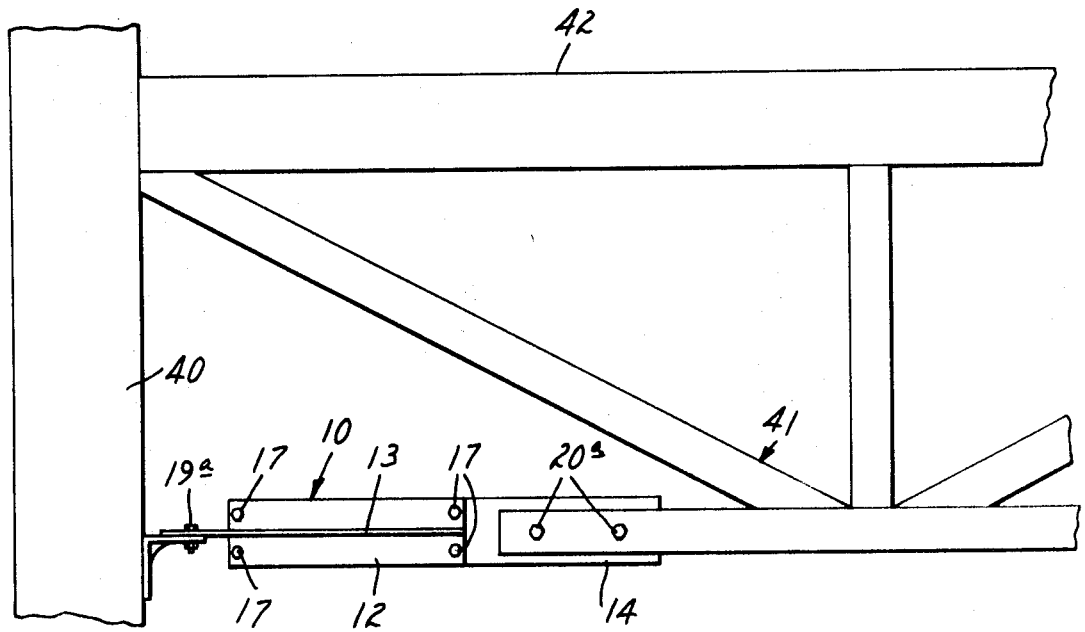
FIG. 4 is a schematic representation of an illustrative assembly in a building of a damping unit of FIG. 1.

A damping unit 10 may be mounted as illustrated in FIG. 4 between a supporting column 40 and a truss 41 at the approximate level of the ceiling of the room beneath the truss. Bolts 20a extend through the holes 20 in the bar 14 to fasten the damping unit to the truss 41, and bolts 19a extend through the holes 19, 19' in the webs 13, 13' to rigidly secure the damping unit to the column 40. After being mounted, the bolts 17 may be removed and, if desired, the shims 18 as well. Preferably, the bolts 17 are loosened just sufficiently to insure free relative longitudinal movement but without completely releasing the stress on the spring washers 23, thus guarding against separation due to any nonlongitudinal force. To permit this, the assembly holes 14a in the bar 14 should be oversize to provide sufficient play so that the bolts do not restrict the relative longitudinal movement between the bar 14 and the flanges 12, 12'.

The truss 41 is structurally fastened to the column 40 at the approximate level of the overlying floor 42 so that oscillations of the building cause the flanges 12, 12' and the bar 14 to reciprocate longitudinally with respect to each other and thus subject the viscoelastic layers 15, 15' to horizontal shear stresses. Because of the nature of the viscoelastic layers, kinetic energy in the oscillations is thus absorbed. In this application, the damping units are not functioning as bearing or structural devices.

The bidirectional damping unit of this invention may be incorporated into a load-bearing device 50 as illustrated in FIG. 5, the load being carried by a spring 51, while the damping unit 10 serves to damp oscillations in the load. The ends of the spring 51 and of the damping unit 10 are provided with means (indicated generally by reference characters 52 and 53) for structurally mounting the load-bearing device 50. Instead of a single spring, the damping unit 10 may be positioned centrally between two or more springs or may be employed with other types of load-bearing members which are resilient or resiliently mounted to permit relative movement in the direction along the line between the mounting means 52 and 53.

The shear moduli and the loss tangent of the viscoelastic damping material may conveniently be measured by means of the rotating beam instrument of Maxwell [see ASTM Bulletin No. 215, 76 (July 1956)]. The typical specimen used in that instrument is a rod, but since the viscoelastic materials most suitable for this invention are preferably more compliant than the plastic materials for which the Maxwell instrument was designed, the rod specimen is replaced by the arrangement shown in FIG. 6 in which the viscoelastic material is confined as an interlayer of spherical configuration between a ball 60 and a socket 61, 62. A projection 63 of the socket is attached to a drive mechanism (not shown). A cylindrical rod 64 integral with the ball 60 contacts a biaxial dynamometer which consists of two load cells mounted in quadrature (the first shown at 65 and the second load cell not shown). The rod is deflected as shown a predetermined amount by displacing the dynamometer parallel to the primary axis of the load cell about one degree of arc, this axis being perpendicular to the axis of the rod prior to deflection. The ball and socket assembly is then rotated at a rate corresponding to the desired frequency. For example, to obtain a frequency of 0.1 cycle per second, the assembly is rotated at 0.1 revolution per second.

A slab of viscoelastic material to be tested was prepared at a thickness about 1–2% greater than the spacing between the ball 60 and socket 61, 62. This was cut into about 10 truncated lunes which were laid up on the ball 60. The socket was closed, the rod 64 was deflected, and the socket was rotated for about two hours at 10 revolutions per second to heat the viscoelastic material just enough to cause it to coalesce into a uniform layer 66. Excess viscoelastic material which squeezed out is not shown in the drawing.

After the viscoelastic layer had cooled to room temperature, the two load cells were connected to chart recorders and the apparatus was rotated at 0.1 revolution per second for about 10 cycles, and the average force at each load cell was determined mathematically. Elastic shear modulus $G'$, loss shear modulus $G''$, and loss tangent $D$ were determined as follows:

$$G' = \frac{hm^2}{\pi r^4 (3\theta - \sin \theta \cos \theta)} \frac{F_1}{(\Delta X_t - K_1 F_1)}$$

$$D = \frac{F_2(\Delta X_t - K_1 F_1) + K_2 F_1 F_2}{F_1(\Delta X_t - K_1 F_1) - K_2 F_2^2}$$

$$G'' = DG'$$

where $h$ is the spacing between ball and socket ($\frac{1}{16}$ inch—0.159 cm.); $m$ is the moment arm of the dynamometer ($2\frac{1}{8}$ inches—5.45 cm.); $r$ is the radius of the ball ($\frac{3}{8}$ inch—0.95 cm.); $\theta$ is 0.915 radian; $\Delta X$ is the displacement of the dynamometer along the primary axis of the first load cell 65; $K_1$ and $K_2$ are the spring constants of the first and second load cells, respectively; and $F_1$ and $F_2$ are the average forces at the first and second load cells, respectively.

EXAMPLE 1

The bidirectional damping unit illustrated in FIGS. 1 and 2 has been constructed using ½-inch steel for the bar 14 and 0.3-inch steel for the T-sections 11, 11'. The material of the viscoelastic layers 15, 15' was a copolymer of 80 parts of iso-octyl acrylate and 20 parts of acrylic acid prepared as follows.

To a mixture of 100 pounds of iso-octyl acrylate, 25 pounds of acrylic acid and 232 pounds of ethyl acetate was added 114 grams of 2,2'-azo-bis (isobutyronitrile) as catalyst. Then under a nitrogen atmosphere and with slow agitation, the temperature was gradually increased to and maintained at 55° C. for 6 hours using a water-cooled jacket. After 6 hours, 114 grams of the same catalyst were added and the reaction continued at 55° C. for an additional 4 hours. During the 10-hour reaction period, ethyl acetate was added as necessary to keep the temperature from rising above 55° C. After the 10-hour period, the temperature was increased to and maintained at 63° C. for another 4 hours. The product was drained through a 100-micron filter. Inherent viscosity measured in methyl ethyl ketone was 1.55.

The filtered product was knife-coated on a glassine-kraft paper carrier web having a silicone-treated release surface on both sides. The coated carrier web was dried in an air circulating oven at about 100° C. for 2 minutes followed by about 155° C. for 3 minutes and finally about 130° C. for 6.5 minutes to provide a dried coating about 1 mil (25 microns) in thickness, whereupon the coated carrier web was wound upon itself in roll form for storage. To insure that the coating was sufficiently dry, a small piece of the coating was weighed and then conditioned for two hours at 24° C. and 30% relative humidity and reweighed. No loss in weight indicated that the coating was substantially free from volatile material and thus could be used for a viscoelastic layer. Had the specimen lost weight during the conditioning period, this would indicate presence of trapped volatiles which could result in undesirable change in damping performance during gradual emission of the volatiles from the viscoelastic layers.

A metal roll of 30-inch diameter was wrapped with biaxially-oriented and heat-set polyethylene terephthalate film of 5-mil (0.127 mm.) thickness and preheated to 93° C. by internally circulated heated oil. While this roll was rotated, the coated carrier web was pressed against this film by a spring-loaded laminating roll to transfer the copolymer coating to the terephthalate film, and the carrier web was stripped away. This was continued until the successive convolutions of the copolymer coating reached a total thickness of 50 mils (1.27 mm.). This and the terephthalate film were slit for removal, allowed to cool, and pieces about 4¼ by 10¼ inches were cut out using a rule die. Each piece was given a momentary squeeze in a hydraulic press at about 65° C. and 250 p.s.i. to flatten irregularities and to squeeze out some of the occluded air. The terephthalate film was removed, and the ends of each piece were taped and supplied with 0.055-inch shim wire as shown in FIG. 3. The backing of the tape used for this purpose was glassine-kraft paper having a silicone-treated release surface on both surfaces. One surface had a pressure-sensitive adhesive coating to hold the tape in place and to secure the shim wire.

The taped viscoelastic pieces were employed in the contruction of damping units in the manner described above in connection with the drawing. The adhesive layers 16, 16' were provided by a composition consisting essentially of equal parts by weight of a bisphenol-epichlorohydrin epoxy resin having an epoxy equivalent of about 185–190 and polyamide resin addition product of polymerized long chain fatty acid and polyfunctional amine (specifically "Versamid" 125 which has an amine value of 290–320 and a viscosity at 40° C. of 80–120 poises). The adhesive compositon also contained 15 parts of thixotropic agent per 100 parts of epoxy plus polyamide resin. Specifically, the thixotropic agent was a mixture of dimethyl dioctadecyl ammonium bentonite ("Benton-34") and powdered silica ("Carbosil"). The shear strength of a 7.5-mil layer of this adhesive after curing 24 hours at room temperature is at least 3200 p.s.i.

After the assembly bolts 17 were tightened against the wire shims 18, the assembly was set aside for 2–3 hours at room temperature, after which the viscoelastic layers 15, 15' and adhesive layers 16, 16' were trimmed to the 4-inch width of the damping unit 10.

For purposes of testing, thermocouples were embedded in the viscoelastic layers of a number of the damping units of this example which were stored for several days and then conditioned for at least 24 hours between about 21° and 25° C. immediately prior to testing. Each damping unit was bolted to the test machine with four bolts through attaching holes 19, 19', 20, with care taken not to subject the viscoelastic layers 15, 15' to any static force.

The assembly bolts 17 were slightly loosened and the shim wires 18 removed. The viscoelastic layers were then subjected to deformation by sinusoidally alternating tensile and compressive force longitudinally to produce a shear displacement amplitude of 0.020 inch (total relative movement 0.040 inch) at a frequency of 0.1 cycle per second. Feedback control was employed to keep the frequency constant. Force vs. displacement was plotted on a chart recorder, and the area $A_c$ within the charted loop was determined with a planimeter.

Loss shear modulus $G''$ was calculated from $$G'' = \frac{A_c C_1 C_2}{\pi \gamma^2 V}$$

where $C_1$ is the force scale factor in pounds per inch (grams per cm.) of chart, $C_2$ is the displacement scale factor in inches per inch (cm. per cm.) of chart, $\gamma$ is the maximum shear strain per inch (cm.) of chart, and $V$ is the volume of the viscoelastic material. Complex shear modulus $G^*$ was calculated from $$G^* = \frac{F}{A_v \gamma}$$

where $A_v$ is the total shear area of the viscoelastic layers 15, 15', and the stiffness value $F$ is the average of the axial forces to produce the maximum compression and extension. Elastic shear modulus $G'$ was determined by $$G' = [(G^*)^2 - (G'')^2]^{1/2}$$

Loss tangent D was calculated from $$D = \frac{G''}{G'}$$

In the test of a specific damping unit, the charted loop was measured for the first cycle when the temperature of the viscoelastic layer was 22.2° C., again measured when the temperature had increased to 23.9° C., and measured a third time during the 100th cycle, at which point the temperature was 24.4° C. and the test was interrupted. On standing, the temperature of the viscoelastic layer decreased to 22.2° C., at which point the testing machine was restarted and the next charted loop was measured. Results were:

|  | Temperature | | | |
| --- | --- | --- | --- | --- |
|  | 22.2° C. | 23.9° C. | 24.4° C. | 22.2° C. |
| Cycle number | 1 |  | 100 | 101 |
| $G''$ (p.s.i.) | 450 | 370 | 345 | 450 |
| $G'$ (p.s.i.) | 305 | 250 | 235 | 310 |
| $G^*$ (p.s.i.) | 540 | 445 | 415 | 550 |
| D | 1.45 | 1.5 | 1.45 | 1.45 | or in metric units:

|  | Temperature | | | |
| --- | --- | --- | --- | --- |
|  | 22.2° C. | 23.9° C. | 24.4° C. | 22.2° C. |
| Cycle number | 1 |  | 100 | 101 |
| $G''$ (kg./cm.$^2$) | 31.5 | 26 | 24 | 31.5 |
| $G'$ (kg./cm.$^2$) | 21.5 | 17.5 | 16.5 | 22 |
| $G^*$ (kg./cm.$^2$) | 38 | 31.5 | 29 | 39 |
| D | 1.45 | 1.5 | 1.45 | 1.45 |

From these and other tests at somewhat different temperatures within the range of ordinary room temperatures, very little difference has been noted between values at the first and the 101st cycles, indicating excellent resistance to fatigue.

The same damping unit was later conditioned for 24 hours at 24° C. and 50% relative humidity and then aligned between the heads of a Baldwin Universal Testing Machine. The heads were moved toward each other at a rate of 0.48 inch (1.22 cm.) per minute until the damping unit failed by shearing of the viscoelastic layers. The deformation of the viscoelastic layer at break was 0.30 inch (0.76 cm.), indicating a shear-strain value of 6.0. The maximum compression was 53,500 pounds (24,300 kg.) at fracture, indicating an ultimate shear strength of 670 p.s.i. (47 kg./cm.$^2$.).

Viscoelastic material similar to that of Example 1 was separately tested on the apparatus of FIG. 6. As in Example 1, the viscoelastic material was a copolymer of 80 parts iso-octyl acrylate and 20 parts acrylic acid but was made in a smaller batch under somewhat different conditions such that its inherent viscosity was only 1.09. After conditioning overnight at 23.3° C. and 50% relative humidity, results under those conditions at 0.1 cycle per second were:

$G''$: 105 p.s.i. (7.4 kg./cm.$^2$)
$G'$: 142 p.s.i. (10 kg./cm.$^2$)
$G^*$: 183 p.s.i. (13 kg./cm.$^2$)
D: 0.74

The glass transition temperature of this viscoelastic material, measured by differential thermal analysis at a heating rate of 10° C. per minute, was −7° C.

A slab of this viscoelastic material of 1.09 inherent viscosity was conditioned for 24 hours at 24° C. at 50% relative humidity and then tested under those conditions in an Instron Tensile Tester. Its tensile strength was 1260 p.s.i. (98.5 kg./cm.$^2$) at a break elongation of 800%.

EXAMPLE 2

A bidirectional damping unit similar to that of Example 1 was prepared except using shorter T-sections 11, 11' and bar 14 with a different viscoelastic material. The viscoelastic material consisted of a terpolymer of 65 parts by weight of iso-octyl acrylate, 25 parts of acrylonitrile and 10 parts of acrylic acid. A 50-mil (1.3-mm.) slab of the viscoelastic material was die cut to 4¼ by 2¾ inches (11 by 7 cm.), and the whole was assembled as described in Example 1, after which the viscoelastic and adhesive layers were trimmed to the 4-inch (10-cm.) width of the damping unit.

The resultant damping unit was conditioned and tested as in Example 1 except that the deformation was a sawtooth function instead of sinusoidal, and feedback was not employed to control the frequency. The damping unit was tested at 22.8° C., first at 0.80 and a short time later at 0.87 cycle per second. Average results for the first complete cycle in each test were:

$G''$: 325 p.s.i. (23 kg./cm.$^2$)
$G'$: 510 p.s.i. (36 kg./cm.$^2$)
$G^*$: 605 p.s.i. (43 kg./cm.$^2$)
D: .64

The equipment by which these values were obtained was not as sophisticated as that used in Example 1, and when used to test a short damping unit employing the viscoelastic material of Example 1, (length of viscoelastic layer 2¾ inches), average results for the first complete cycle of a large number of tests at an average frequency of .09 were:

$G''$: 310 p.s.i. (22 kg./cm.$^2$)
$G'$: 365 p.s.i. (26 kg./cm.$^2$)
$G^*$: 480 p.s.i. (34 kg./cm.$^2$)
D: .85

The viscoelastic material of Example 2 was too stiff for measurements using the apparatus of FIG. 6 and too soft for accurate measurement by the torsion pendulum. However, a polymer of 70 parts by weight iso-octyl acrylate, 20 parts acrylonitrile and 10 parts acrylic acid was suitable for measurement using the FIG. 6 apparatus at 0.1 c.p.s. after overnight conditioning at 23.3° C. and 50% relative humidity. In addition, polymers of the same monomers, except at proportions of 60:30:10 and 50:40:10 were measured by a torsion pendulum at 23.3° C. and at frequencies between about 0.1 and one cycle per second, with the results extrapolated to 0.1 c.p.s. From these values, moduli were plotted versus composition and interpolated to provide the following values for a 65:25:10 terpolymer:

G'': 340 p.s.i. (24 kg./cm.²)
G': 550 p.s.i. (39 kg./cm.²)
G*: 650 p.s.i. (46 kg./cm.²)
D: 0.62

As determined in Example 1, the tensile strength of the 65:25:10 terpolymer was 1775 p.s.i. (125 kg./cm.²) at a break elongation of 257%, and its glass transition temperature was 0° C.

Another viscoelastic material useful for the present invention is the terpolymer of 72.5 parts iso-octyl acrylate, 20 parts acrylonitrile and 7.5 parts acrylic acid. When tested at 0.1 c.p.s. and 23.3° C. on the device of FIG. 6, it showed:

G'': 85 p.s.i. (6 kg./cm.²)
G': 140 p.s.i. (10 kg./cm.²)
G*: 165 p.s.i. (12 kg./cm.²)
D: 0.60

Another composition which cures at room temperature to a thermoset state and has satisfied the requirements for the adhesive layers 16, 16' in the damping unit construction illustrated in the drawing consists of 25 parts epoxy resin, 3 parts of a polythiol, 10 parts of inorganic filler and 4 parts of an amine converter. Such adhesive is marketed by the Borden Chemical Company under the designation "Epiphen ER–825–A."

Reference is now made to FIGS. 7–11 which show various modifications and applications of the damping unit to which the present invention is directed. The damping unit 70 shown in FIGS. 7 and 8 includes a pair of rigid bars 71, 72 separated by a viscoelastic layer 73. Bolts 74 secure the relatively wide bar 71 to the underside of a girder 75, the upper side of which is structurally secured to a column 76. The bar 72 is mounted to the column 76 by bolts 77. If desired, the rigid bar 71 may be eliminated by providing the underside of the girder 75 with a smooth flat surface to which the viscoelastic layer 73 is directly adhered. In this case, it is preferred to bolt the bar 72 to the girder 75 until a firm adherent bond has developed between the viscoelastic layer 73 and the surface of the girder 75. The bolts may then be loosened and left in place to protect the damping unit from accidental delamination, assuming the bolt holes are sufficiently oversize.

The damping unit may be constructed from two concentric rigid tubular members separated by a cylindrical layer of viscoelastic material. Such a construction may be somewhat more expensive than the various constructions illustrated in the drawings since it normally requires that the outer tubular member be pointed for assembly after the viscoelastic layer has been applied to the inner tubular member, expect where the viscoelastic material is adapted to be polymerized in situ from liquid ingredients.

Referring to FIG. 9, a girder 80 may be connected to a column 81 solely by a pair of damping units 82, 83, each of which is constructed and attached to the girder 80 similarly to damping unit 70 of FIGS. 7 and 8 except that there must be some means (schematically indicated at 84) to keep the weight of the girder 80 from compressing the viscoelastic layer 85, such as roller bearings. The other end of the girder 80 may be rigidly attached to another column, or it may be fastened in the manner shown in FIG. 7. If desired, both ends of the girder 80 may be connected as in FIG. 9 without any structural connection to the columns. Such a free-floating assembly should provide a high degree of damping of subsonic oscillations localized in the girder 80 and the overlying floor. For example, subsonic oscillations have heretofore been troublesome in floors suspended over extensive column-free areas.

The assembly shown in FIG. 9 may be modified by structurally securing the girder 80 at the central point 85 rigidly to the column 81. With such modification, the damping units 82, 83 would be effective to damp bending forces in the column, whereas the assembly of FIG. 9 would also damp reciprocating movement of the girder 80 with respect to the column 81.

Referring now to FIGS. 10 and 11, a plurality of damping units 90 are positioned around the base of a tall stack 91. Each damping unit 90 comprises a bar 92 and an I-beam 93 having broad flat surfaces separated by a viscoelastic layer 94. The bar 92 is secured to a fitting 95, and the I-beam 93 is secured to an anchor 96 which may be, but need not be, integral with the stack 91.

Subsonic oscillations may also be damped through guys attached to upper portions of the stack. Each guy is connected to an anchor through a damping unit such as the damping unit 10 shown in FIGS. 1 and 2. In this case, the anchors would normally not be part of the stack but can be considered part of the whole building structure represented in part by the soil structure in which both the stack and anchors are set.

The physical characteristics of the viscoelastic material specifically disclosed hereinabove vary with changes in temperature to a degree making it desirable that the damping unit be maintained in use within a limited range of temperatures. In most buildings, this is readily accomplished by air-conditioning the area within which the damping units are located. For use of the damping units in other types of building structures such as tall bridges and stacks, it may be desirable to provide insulated housing for the damping units plus means for heating and/or cooling to maintain the damping units within the design temperature range.

Various other techniques are available for utilizing the damping unit to which the present invention is directed. For example, diagonal braces may be attached at one end to the building structure through the novel damping unit. Such a technique is especially applicable to hotels where permanent interior walls are available to house the diagonal braces.

We claim:
1. Damping unit for a building or structure which is subject to subsonic oscillations, said damping unit comprising at least two rigid members, each having a stiffness exceeding that of 0.1-inch steel plate and having at least one broad surface closely spaced from a broad surface of an adjacent of said rigid members, and a layer of viscoelastic material bonded to the broad surfaces of the adjacent rigid members and having:

a glass transition temperature of 5° C. to −50° C.,
a loss tangent of at least 0.5 measured at 23° C. and a frequency of 0.1 cycle per second,
a complex shear modulus of about 50–1000 pounds per square inch at 23° C. and a frequency of 0.1 cycle per second,
a shear strain value of at least about one at 23° C and a frequency of 0.1 cycle per second,
an ultimate shear strength of at least 200 p.s.i. at 23° C.,
an elongation in tension of at least 100% at 23° C., and
the bond between the viscoelastic material and the broad rigid surfaces does not fail when the shear strain in the viscoelastic layer is one.

2. A damping unit as defined in claim 1 wherein said viscoelastic material comprises a copolymer of acrylic monomers.

3. A damping unit as defined in claim 2 wherein said viscoelastic material comprises a copolymer of (a) 60–85 parts of an alkyl acrylate having about 6–10 carbon atoms in its alkyl group which is not highly branched or a mixture of alkyl acrylates having an average of 6–10 carbon atoms in their alkyl groups, less than half of which are highly branched, and (b) correspondingly 40–15 parts of at least one of acrylic acid, methacrylic acid, acrylonitrile, methacrylonitrile, acrylamide and methacrylamide.

4. A damping unit as defined in claim 2 wherein said viscoelastic material comprises a copolymer of about 80 parts of octyl acrylate, the octyl group of which is not highly branched, and 20 parts of acrylic acid.

5. A damping unit as defined in claim 1 wherein the bond between the viscoelastic material and the broad rigid surfaces is attained by a pair of adhesive layers, which adhesive has
- a shear strength at least as great as that of the viscoelastic material,
- a stiffness value at least ten times that of the viscoelastic material, and
- a bonding strength to the material of said rigid members and to the material of said viscoelastic layer which in shear substantially equals or exceeds the shear strength of the viscoelastic material.

6. A damping unit as defined in claim 5 wherein said adhesive is a thermoset epoxy resin composition.

7. Damping unit for a building or structure which is subject to subsonic oscillations, said damping unit comprising at least two rigid members, each having a stiffness exceeding that of 0.1-inch steel plate and having at least one broad surface separated from a broad surface of an adjacent one of said rigid members, and a layer of viscoelastic material which is firmly bonded to said surfaces and has at ordinary room temperature a loss tangent of at least 0.3 and a shear strain value of at least 10% measured at a frequency of 0.1 cycle per second, said rigid members having attaching means for securing one of said rigid members to one point and for securing another of said rigid members to another point of the building or structure, which points experience relative motion as a result of the oscillations such that the oscillations tend to be damped by shearing forces within the viscoelastic layer.

8. A building structure subject to subsonic oscillations wherein each of a plurality of damping units as defined in claim 7 is connected between sets of pairs of points of the structure which experience relative motion as a result of the oscillations.

9. Damping unit for a building or structure which is subject to subsonic oscillations, said damping unit comprising at least two rigid members, each having a stiffness exceeding that of 0.1-inch steel plate and having at least one broad surface substantially uniformly closely spaced from a broad surface of an adjacent of said rigid members, and a layer of viscoelastic material positioned between the broad surfaces of the adjacent rigid members and firmly bonded thereto and having a loss tangent of at least 0.5, a loss shear modulus of about 50–50,000 p.s.i., and a shear strain value of at least 10% measured at 23° C. and at a frequency of 0.1 cycle per second, said rigid members having attaching means for securing one rigid member to one point of the building or structure and for securing a said adjacent member to another point of the building or structure, which points experience relative motion as a result of the subsonic oscillations, such that the oscillations tend to be damped by shearing forces within the viscoelastic layer.

10. Damping unit as defined in claim 9 having three of said rigid members and a said viscoelastic layer between each adjacent pair of rigid members, the central rigid member having a pair of flat, parallel broad surfaces and attaching means extending generally longitudinally from said broad surfaces in one direction, and the outer two rigid members each having a flat broad surface and attaching means extending generally longitudinally from their broad surfaces in the opposite direction.

11. Damping unit as defined in claim 9 wherein said rigid members are tubular and telescoping and said layer of viscoelastic material is cylindrical.

References Cited

UNITED STATES PATENTS

| | | | |
|---|---|---|---|
| 3,399,104 | 8/1968 | Ball et al. | 188—1(B)UX |
| 3,327,812 | 6/1967 | Lazan | 188—1(B) |
| 3,324,974 | 6/1967 | Champlin et al. | 188—1(B) |

DUANE A. REGER, Primary Examiner

U.S. Cl. X.R.

52—173